United States Patent [19]

Shimada et al.

[11] Patent Number: 4,743,411

[45] Date of Patent: May 10, 1988

[54] PROCESS FOR PRODUCING SHAPED SILICON CARBIDE ARTICLE FROM A POLYCARBOSILASTYRENE COPOLYMER

[75] Inventors: Keizo Shimada, Iwakuni; Toshihiro Aoyama, Nagareyama; Hidetsugu Yoshida, Iwakuni, all of Japan

[73] Assignee: Teijin Limited, Osaka, Japan

[21] Appl. No.: 895,803

[22] Filed: Aug. 12, 1986

[30] Foreign Application Priority Data

Aug. 16, 1985 [JP] Japan ................. 60-179359
Aug. 27, 1985 [JP] Japan ................. 60-186593
Oct. 9, 1985 [JP] Japan ................. 60-223839

[51] Int. Cl.$^4$ ................................... C07F 7/02
[52] U.S. Cl. ................. 264/22; 264/29.2; 264/29.6; 264/56; 264/65; 264/101; 264/211.14; 264/211.15; 264/211.17; 264/236; 264/347; 522/99; 522/148; 523/307; 528/25
[58] Field of Search ............ 264/29.2, 29.6, 22, 264/56, 85, 101, 211.14, 211.17, 236, 347, 65, 211.15; 528/25; 522/99, 148; 523/307

[56] References Cited

U.S. PATENT DOCUMENTS

| | | | |
|---|---|---|---|
| 4,052,430 | 10/1977 | Yajima et al. | 528/35 |
| 4,324,901 | 4/1982 | West et al. | 528/14 |
| 4,377,677 | 3/1983 | Iwai et al. | 528/35 |
| 4,472,591 | 9/1984 | Schilling, Jr. et al. | 556/430 |
| 4,595,472 | 6/1986 | Haluska | 522/99 |
| 4,611,035 | 9/1986 | Brocon-Wensley et al. | 525/474 |

FOREIGN PATENT DOCUMENTS 58213026 6/1982 Japan.

*Primary Examiner*—Jan H. Silbaugh
*Assistant Examiner*—Hubert C. Lorin
*Attorney, Agent, or Firm*—Burgess, Ryan & Wayne

[57] ABSTRACT

A polycarbosilastyrene copolymer which comprises recurring carbosilane units of the formula I:

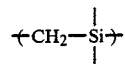

and recurring silastyrene units of the formula II:

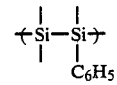

is useful for producing a shaped sintered silicon carbide article by shaping the polycarbosilastyrene copolymer to a desired form, by applying an ultra-violet ray treatment or heat treatment to the shaped article, and by sintering the resultant cross-linked, non-fusible shaped article at an elevated temperature.

16 Claims, 4 Drawing Sheets

PROCESS FOR PRODUCING SHAPED SILICON CARBIDE ARTICLE FROM A POLYCARBOSILASTYRENE COPOLYMER

BACKGROUND OF THE INVENTION

1. Field of the Invention

The present invention relates to a polycarbosilastyrene copolymer, a method for producing the same and a process for producing a shaped or molded silicon carbide article from the same.

More particularly, the present invention relates to a polycarbosilastyrene copolymer which is easily shaped to a desired form and converted to a sintered silicon carbide article, a method for producing the same from a corresponding polysilastyrene copolymer, and a process for producing a shaped silicon carbide article for example, silicon carbide filaments or films, from the same.

2. Description of the Related Art

Various methods have been attempted for producing shaped, sintered silicon carbide articles, for example, silicon carbide filaments or films. In particular, methods for producing silicon carbide filaments which include (1) chemical deposition, (2) chemical conversion of precursory carbon filaments, and (3) conversion of precursory polymer filaments. Among the above-mentioned methods, the chemical deposition method and the precursory polymer filament-conversion method are usually employed for producing commercial silicon carbide filaments.

The chemical deposition method includes a method in which carbon filaments or tungsten filaments are brought into contact with silicon tetrachloride gas, hydrogen carbide gas, and hydrogen gas so as to allow the resultant silicon carbide to deposit on the carbon or tungsten filaments.

In another method, which is close to the chemical deposition method, precursory carbon filaments are brought into contact with silicon which has been produced by the heat decomposition of silicon tetrachloride, to cause the precursory carbon filaments to be converted to silicon carbide filaments.

In the above-mentioned two methods, the deposition of silicon carbide and the conversion of carbon to silicon carbide are effected only at an elevated temperature, for example, 1200° to 1600° C. Therefore the cost of the methods is very high and the resultant silicon carbide filaments have a large thickness, which means that the resultant filaments can be used only in limited fields and only in a restricted usage.

In the precursory polymer filament-conversion method, precursory filaments are produced from an organic silicon polymer, that is, polycarbosilane, and then converted to non-fusible polycarbosilane filaments by cross-linking, and finally to silicone carbide filaments by sintering or baking.

This precursory polymer filament-conversion method was invented for the first time by Professor Yajima et al of the Metal Material Research Institute of Tohoku University, and has been disclosed in Japanese examined patent publication Nos. 57-26527, 58-38534, 58-38535, and 59-33681, and Japanese unexamined patent publication Nos. 56-9209 and 56-74126

Also, Japanese unexamined patent publication No. 58-213026 discloses a polysilane polymer cross-linked with an organic metal compound and a process for producing the cross-linked polysilane polymer.

The above-mentioned method for producing silicon carbide filaments from the polycarbosilane polymer is capable of producing silicon carbide filaments wherein individual filaments each have a diameter of 10 $\mu$m to 50 $\mu$m. However, this method consists of a number of steps, a long time is needed to complete the method and, therefore, the work is difficult. For example, the method includes a first step in which compounds having Si-C bonds, compounds having Si-C and Si-H bonds, compounds having Si-halogen atom bonds, compounds having Si-N bonds, compounds having Si-OR wherein R represents an organic radical, compounds having Si-OH bonds, compounds having Si-Si bonds, and/or compounds having Si-OS bonds are polymerized at a temperature of from 300° C. to 1200° C. to produce an organic silicone polymer containing a silicon-carbon backbone structure; a second step in which the organic silicone polymer material is subjected to a treatment effective for decreasing the content of low molecular weight compounds in the polymer material and the resultant produced is subjected to an organic solvent extraction procedure or to an aging procedure in vacuum or in an atmosphere of air, $CO_2$ gas or an inert gas at a temperature of from 50° C. to 700° C. to provide an organic silicone polymer; a third step in which the organic silicone polymer is subjected to a spinning procedure to provide organic silicone polymer filaments; a fourth step in which the filaments are heated in an oxidative atmosphere at a relatively low temperature of 50° C. to 350° C. for a time of several minutes to 3 hours; a fifth step in which the low temperature heated filaments are preliminarily heated in vacuum or in an atmosphere of an inert gas, CO gas or hydrogen gas at a temperature of 350° C. to 800° C.; and a sixth step in which the preliminarily heated filaments are sintered under vacuum or in an atmosphere of an inert gas, CO gas or hydrogen gas at a high temperature of 800° C. to 1200° C., to provide silicon carbide (SiC) filaments.

The above-mentioned method for producing the silicon carbide filaments from the polysilane polymer includes 6 steps. Japanese examined patent publication No. 50-38534 discloses a modified silicon carbide-producing method in which the fourth low temperature heating step in an oxidative atmosphere at a temperature of 50° C. to 300° C. for several minutes to 3 hours is omitted. In this modified method, in the second step, it is necessary to sufficiently reduce the content of the low molecular weight compounds in the organic silicon polymer material, and this of necessity, prolongs the time for the second step and requires greater care. Also, in the fifth step, it becomes necessary for the polymer filaments to be heated to a temperature of from 350° C. to 800° C. under vacuum to sufficiently remove the remaining low molecular weight compounds by means of distillation or evaporation. In this fifth step, if the removal of the low molecular weight compounds is unsatisfactorily carried out, the resultant filaments in the fifth step are melt-bonded to each other and, therefore, the resultant filaments are useless as high strength filaments or as reinforcing filaments.

In order to eliminate the above-mentioned disadvantages, Professor Robert West provided a new method in which polysilastyrene was used as an organic silicone polymer and polysilastyrene filaments were easily converted to silicon carbide filaments without applying the heating step in an oxidative atmosphere. This method is disclosed in Japanese unexamined patent publication No. 58-215426.

In this method, the polysilastyrene polymer is cross-linked and is made non-fusible by radiating electron beam or electron spectra having a wave length shorter than that of visible rays.

The important difference between the polysilastyrene-using method and the conventional polycarbosilane-using methods is as follows.

In the method in which a polycarbosilane polymer is used as a spinning material, for example, a method now industrially utilized, a dimethylpolysilane is produced by polymerizing dichlorodimethylsilane in a solvent consisting of a hydrocarbon, for example, toluene or xylene, in the presence of a sodium catalyst. The resultant dimethylpolysilane has a melting point which is very close to a heat decomposing point thereof, and therefore, cannot be directly melt-spun to provide polycarbosilane filaments. Accordingly, it is necessary to convert the dimethylpolysilane to a soluble, fusible polycarbosilane by heat-treating it in an autoclave at a temperature of from 400° C. to 800° C., and then to melt-spin the resultant polycarbosilane to provide filaments.

In the silicon carbide filament-producing method from a polysilastyrene polymer, dichlorodimethylsilane and dichloromethylphenylsilane are polymerized in a toluene or xylene solvent in the presence of a sodium catalyst to provide polysilastyrene (dimethyl-methylphenyl polysilane). This polysilastyrene polymer is soluble and fusible, and therefore, can be easily shaped into filaments or films by means of a melt-shaping or dry-shaping method. The polysilastyrene polymer has a melting point or softening point of from 80° C. to 130° C., and is readily converted to filaments having a very small thickness of 10 μm to 30 μm.

However, the polysilastyrene filaments are disadvantageous in that, when cross-linked and made non-fusible by ultra-violet ray radiation, the filaments are frequently fuse-bonded to each other and are easily shrunk. Also, the amount of shrinkage is very large, such that the length of the shrunk filaments is ⅓ to ½ the original length of the non-shrunk filaments. Therefore, the filament product cannot be maintained in the original form of a non-shrunk product.

Accordingly, in order to obtain silicon carbide filaments or films having a high mechanical strength from polysilastyrene polymer material, the ultra-violet ray radiation must be applied to the polysilastyrene filaments or films under a very appropriate intensity of tension or in a decreased intensity of radiation of ultra-violet rays within a vacuum chamber for a long time. Also, in the next sintering step, the temperature must be elevated from the ambient temperature to the desired sintering temperature, for example, 1200° C., over a long time of from 20 to 200 hours. Accordingly, this method of conversion of polysilastyrene to silicon carbide is not always advantageous. That is, it is difficult to industrially produce a shaped silicon carbide article having a high mechanical strength by the method wherein a polysilastyrene polymer material is directly shaped to a desired form, for example, a filament or film.

It is known that sintered silicon carbide articles can be produced by adding a bonding agent (sintering assistant agent) consisting of an organic silicon compound, or boron and carbon powder, or an inorganic oxide selected from magnesium oxide, yttrium oxide or aluminum oxide, to the silicon carbide article.

The methods wherein the organic silicon compound is used as a bonding agent include a method disclosed in Japanese unexamined patent publication No. 52-103407, wherein an organic silicon compound having Si-C bonds, Si-Si bonds, and/or Si-OR bonds, in which R represents an organic radical, or a polycarbosilane polymer is used, and another method disclosed in Japanese unexamined patent publication No. 58-215426 in which a polysilastyrene polymer is used. However, the use of an organic silicon compound is disadvantageous in that it is difficult to produce a sintered article from the organic silicon compound monomer alone, and in that when the bonding agent consists of the organic silicon compound alone, the resultant sintered article exhibits an unsatisfactory mechanical strength.

That is, in a conventional method of producing a sintered silicon carbide article by using an organic silicon compound, although a shaped article can be easily produced, the shaped article is undesirably melted and deformed in a heating step for making the shaped article non-fusible Accordingly, in order to make the shaped article non-fusible while maintaining the shaped article in the desired shape, the heating procedure should be carried out at a relatively low temperature of, for example, 50° C. to 450° C., for a long time of 20 to 500 hours Also, it is very difficult to directly convert a shaped article made from a polycarbosilane polymer material or polysilastyrene polymer material alone to a shaped silicon carbide article by sintering or baking. Accordingly, the polycarbosilane and polysilastyrene polymer materials are utilized only as a bonding agent for silicon carbide. That is, in the conventional method, the polycarbosilane or polysilastyrene polymer material is mixed as a bonding agent with silicon carbide powder, the mixture is shaped (molded) to a desired form, and the shaped (molded) article is heated to modify the article to a non-fusible state and then sintered to provide a shaped silicon carbide article But, even in this conventional method, the polycarbosilane and polysilastyrene is frequently decomposed in the sintering procedure. If the sintering reaction is carried out at a high temperature-elevating rate, the shaped (molded) article is sometimes partially melted and deformed, or foams are generated in the shaped (molded) article. Therefore, the resultant sintered shaped (molded) article exhibits an unsatisfactory quality and property.

SUMMARY OF THE INVENTION

An object of the present invention is to provide a new polycarbosilastyrene copolymer having an easy shaping (molding), spinning and film-forming property and an easy sintering property, a method for producing the same at a high efficiency, and a process for producing from the same a shaped, sintered silicon carbide article having a high mechanical strength at a high productivity.

The above-mentioned object can be attained by the polycarbosilastyrene copolymer of the present invention which comprises recurring carbosilane units of the formula (I):

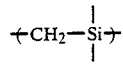

and recurring silastyrene units of the formula (II):

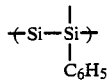

and which has a number average molecular weight of at least 1,000.

The polycarbosilastyrene copolymer is produced by the process of the present invention, which comprises applying a heat treatment, an ultra-violet ray treatment, or both the heat treatment and ultra-violet ray treatment, to a feed comprising a polysilastyrene to convert it to a polycarbosilastyrene copolymer comprising recurring carbosilane units of the formula (I):

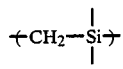

and recurring silastyrene units of the formula (II):

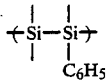

The polycarbosilastyrene copolymer can be converted to a shaped, sintered silicon carbide article by the process of the present invention which comprises the steps of:

shaping (molding) a feed comprising a polycarbosilastyrene copolymer comprising recurring carbosilane units of the formula (I):

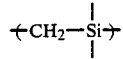

and recurring silastyrene units of the formula (II):

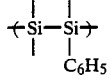

and having a number average molecular weight of at least 1,000, to a desired form, for example, filaments or film;

applying an ultra-violet ray treatment, a heat treatment, or both the ultra-violet ray treatment and the heat treatment to the shaped polycarbosilastyrene copolymer article to provide a cross-linked non-fusible polycarbosilastyrene copolymer article; and then sintering the cross-linked non-fusible polycarbosilastyrene copolymer article at an elevated temperature to provide a shaped, sintered silicon carbide article.

DESCRIPTION OF THE PREFERRED EMBODIMENTS

The new polymer of the present invention is a polycarbosilastyrene copolymer comprising recurring carbosilane units represented by the general formula (I):

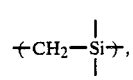

for example, of the formulae:

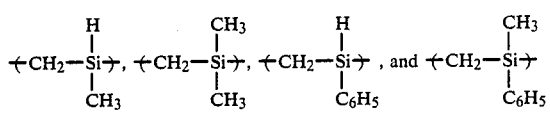

and recurring silastyrene units represented by the general formula (II):

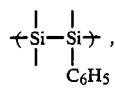

for example, of the formula:

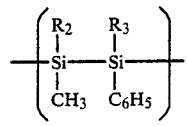

wherein $R_2$ represents a hydrogen atom or a —$CH_3$ or —$C_6H_5$ radical and $R_3$ represents hydrogen atom or a —$CH_3$ or —$C_6H_5$ radical. The polycarbosilastyrene copolymer may be represented by the general formula:

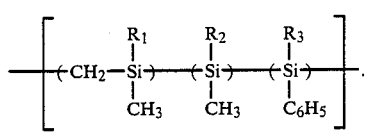

wherein $R_1$ represents a member selected from an H atom and —$CH_3$ radical and $R_2$ and $R_3$ represent respectively and independently from each other, a member selected from an H atom and —$CH_3$ and —$C_6H_5$ radicals.

The polycarbosilastyrene copolymer of the present invention can be produced by applying an ultraviolet ray treatment and/or a heat treatment to a polysilastyrene polymer. That is, the chemical structure of the polycarbosilastyrene copolymer depends on that of the polysilastyrene to be converted.

When the polysilastyrene having recurring units of the formula

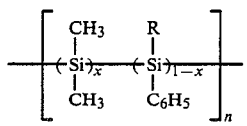

wherein x is a positive number smaller than 1, preferably 0.2 to 0.9, R represents a member selected from the group consisting of —CH$_3$ and —C$_6$H$_5$ and n represents a positive integer, preferably of 5 or more, more preferably of 10 to 3000, is converted, the resultant polycarbosilastyrene copolymer may be represented by the formula:

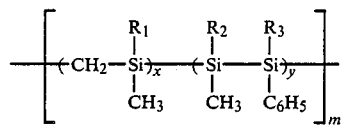

wherein R$_1$, R$_2$ and R$_3$ are as defined above, x and y represent respectively an integer, the ratio x:y being in the range of from 3:7 to 7:3 and m represents a degree of polymerization of the copolymer and corresponds to a molecular weight of the copolymer of from 1,000 to 50,000.

Sometimes, the polycarbosilastyrene copolymer may contain a small amount of intermolecular and/or intramolecular cross linkages.

The molecular structures of the polycarbosilastyrene copolymer can be determined by means of an infrared absorption spectrum analysis, that is, from specific infrared absorptions corresponding to specific chemical bonds and appearing at specific wave numbers.

Figure 1:
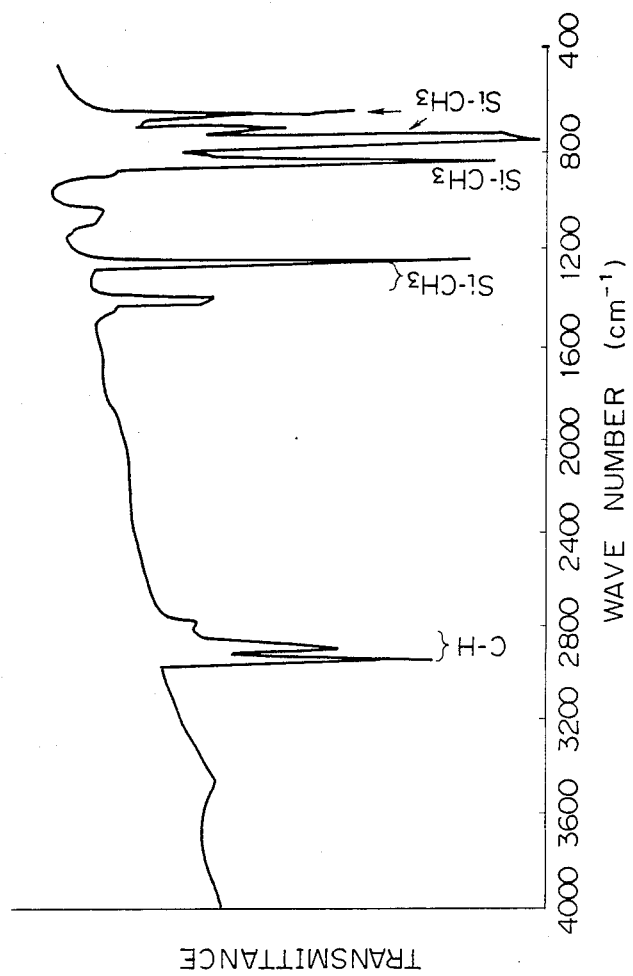
FIG. 1 shows an infrared absorption spectrum of a polydimethylsilane.

Referring to FIG. 1, the infrared absorption spectrum of a polydimethylsilane has no specific absorptions corresponding to the Si-C$_6$H$_5$ bond appearing between wave numbers of 3112 and 2998 cm$^{-1}$; to the

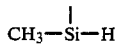

bond appearing beween wave numbers of 2288 and 2055 cm$^{-1}$; or to the

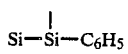

bond appearing between wave numbers of 531 and 444 cm$^{-1}$.

Figure 2:
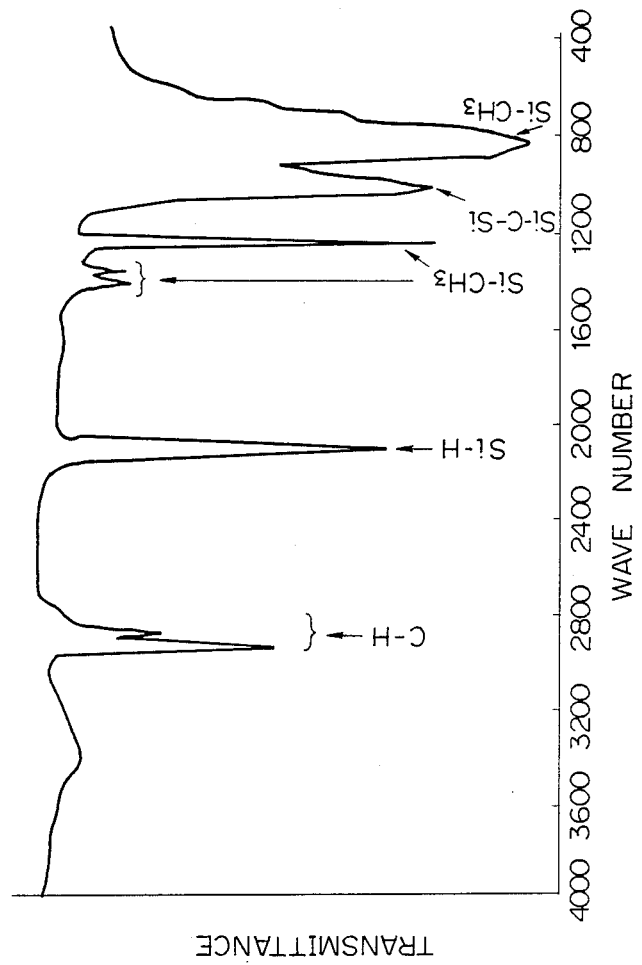
FIG. 2 shows an infrared absorption spectrum of a polycarbosilane.

Referring to FIG. 2, the infrared absorption spectrum of a polycarbosilane has no specific absorptions corresponding to the Si-C$_6$H$_5$ bond appearing between wave numbers of 3112 and 2998 cm$^{-1}$, or to the

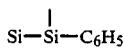

bond appearing between wave numbers of 531 and 444 cm$^{-1}$, and is provided with a specific absorption corresponding to the CH$_3$-Si-H bond appearing between wave numbers of 2288 and 2055 cm$^{-1}$.

Figure 3:
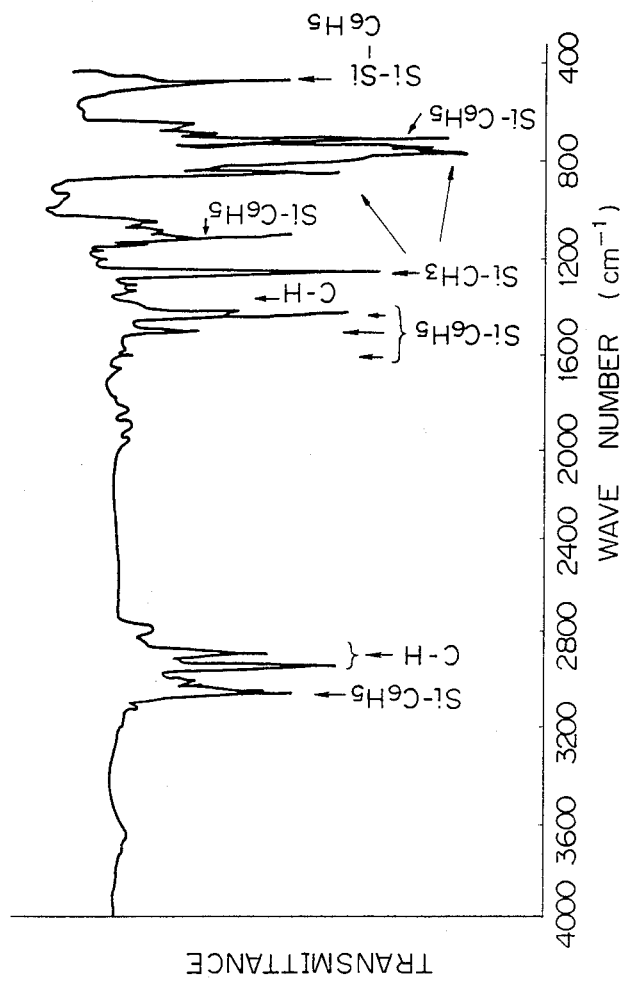
FIG. 3 shows an infrared absorption spectrum of a polysilastyrene.

Referring to FIG. 3, the infrared absorption spectrum of a polysilastyrene is provided with significant specific absorptions corresponding to the Si-C$_6$H$_5$ bond appearing between wave numbers of 3112 and 2998 cm$^{-1}$, and to the

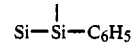

bond appearing between wave numbers of 531 and 444 cm$^{-1}$, and has no specific absorption corresponding to the

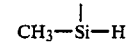

bond appearing between wave numbers of 2288 and 2055 cm$^{-1}$.

Figure 4:
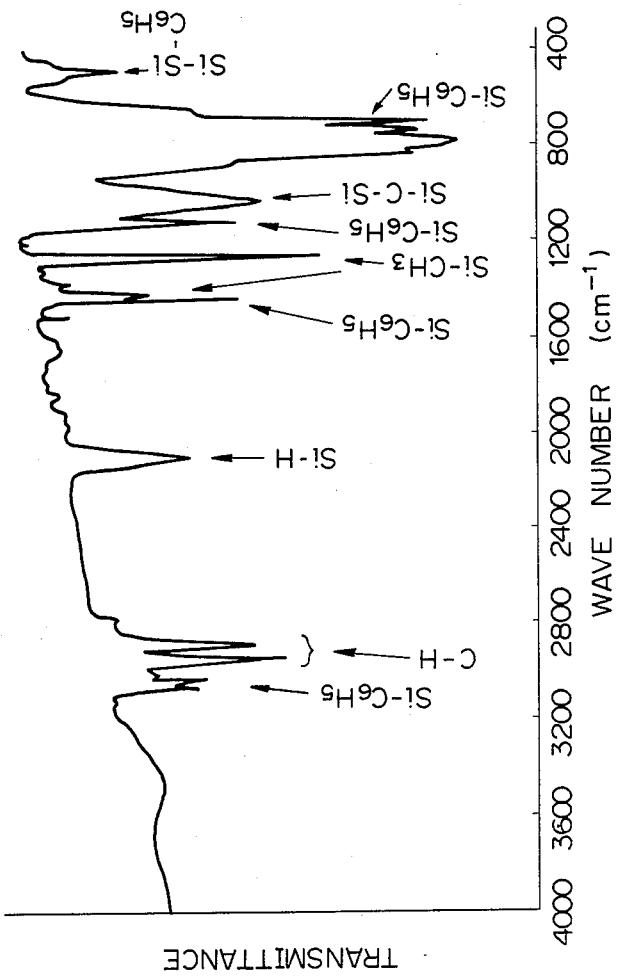
FIG. 4 shows an infrared absorption spectrum of a polycarbosilastyrene copolymer of the present invention.

Referring to FIG. 4, which shows the infrared absorption spectrum of a polycarbosilastyrene copolymer of the present invention, a smaller specific absorption corresponding to the

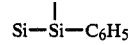

bond appearing between wave numbers of 3112 and 2998 cm$^{-1}$ than that appearing in FIG. 3 and a larger specific absorption corresponding to the CH$_3$-Si-H bond appearing between wave numbers of 2288 and 2055 cm$^{-1}$ are provided.

According to Prof. Robert West, J. Polym. Sci. Polym. Ed. 22, 225-228 (1984), 23, 159-170 (1984), the infrared absorption spectrum of a polysilastyrene as shown in FIG. 3 is provided with a specific absorption corresponding to the C-H bond in the benzene ring in the Si-C$_6$H$_5$ bond at a wave number of 3065 cm$^{-1}$ and a specific absorption corresponding to the Si-Si bond in the

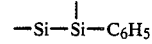

bond at a wave number of 463 cm$^{-1}$, and has no specific absorptions corresponding to the Si-H bond appearing between wave numbers of 2100 and 2080 cm$^{-1}$ or to the Si-CH$_2$-Si bond appearing at a wave number of 1026 cm$^{-1}$.

The infrared absorption spectrum of the new polycarbosilastyrene copolymer of the present invention as shown in FIG. 4, however, is provided with reduced specific absorptions corresponding to the —Si—C$_6$H$_5$ bond and to the

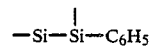

bond, and specific remarkable absorptions corresponding to the Si-H bond at a wave number of 2115 to 2080 cm$^{-1}$, and to the Si-CH$_2$-Si carbosilane bond appearing at a wave number of 1026 cm$^{-1}$. This specific infrared absorption spectrum shown in FIG. 4 indicates that the copolymer of the present invention is an organic silicon polymer comprising both the carbosilane bond and the silastyrene bond, and having the Si-H bond.

It has been confirmed by means of infrared absorption spectrum analysis and NMR analysis that, in the polycarbosilastyrene copolymer of the present invention, the ratio in molar amount of the carbosilane units of the formula (I) to the silastyrene units of the formula (II) is in the range of from 3:7 to 7:3, and the ratio in molar amount of the carbosilane units to the Si-H bonds is in the range of from 2:1 to 1:2.

In an infrared absorption spectrum analysis, an infrared absorption area corresponding to a specific chemical bond and appearing between two specific wave numbers A and B is determined in the following manner.

The infrared absorption spectrum is expressed in a chart wherein the axis of the abscissas represents wave number and the axis of the ordinates represents log $I_0/I$, wherein $I_0$ represents an intensity of incident rays and $I$ represents an intensity of transmitted rays.

In the infrared absorption spectrum curve in the chart, a straight base line is drawn between point a and b on the curve corresponding to the wave numbers A and B, respectively, and an area defined by the straight base line $\overline{ab}$ and a portion of the absorption spectrum curve between points a and b.

In the infrared absorption spectrum of the polycarbosilastyrene copolymer of the present invention, provided that the sum (S) of absorption areas appearing between wave numbers of 3112 cm$^{-1}$ and 2944 cm$^{-1}$ corresponding to the Si-C$_6$H$_5$ bond, 2230 cm$^{-1}$ and 1985 cm$^{-1}$ corresponding to the Si-H bond, 1286 cm$^{-1}$ and 1207 cm$^{-1}$ corresponding to the Si-CH$_3$ bond, 1207 cm$^{-1}$ and 944 cm$^{-1}$ corresponding to the Si-CH$_2$-Si and Si-CH$_3$ bonds, 944 cm$^{-1}$ and 531 cm$^{-1}$ corresponding to the Si-C and Si-CH$_3$ bonds, and 531 cm$^{-1}$ and 444 cm$^{-1}$ corresponding to the

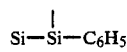

bond appearing between wave numbers of 531 cm$^{-1}$ and 444 cm$^{-1}$ to the sum (S) is in the range of from 0.3 to 3.5.

Also, in an infrared absorption spectrum for he polysilastyrene polymer from which the polycarbosilastyrene copolymer of the present invention is produced, the sum (S') of absorption areas is determined in the same manner as mentioned above and an absorption area percentage (SiP$_M$) appearing between wave numbers of 3112 cm$^{-1}$ and 2998 cm$^{-1}$, or absorption area percentage (SiH$_M$) appearing between wave numbers of 2230 and 1985 cm$^{-1}$, and an absorption area percentage (SiII$_M$) appearing between wave numbers of 531 cm$^{-1}$ and 444 cm$^{-1}$ to the sum (S') are determined.

In the same manner as mentioned above, specific absorption area percentages of polycarbosilane and polydimethylsilane polymers corresponding to specific chemical bonds appearing between specific wave numbers are determined.

Table 1 shows absorption area percentages of between 3112 and 2998 cm$^{-1}$ (Si-C$_6$H$_5$, 2998 and 2744 cm$^{-1}$ (C-H), 2230 and 1985 cm$^{-1}$ (Si-H), 1286 and 1207 cm$^{-1}$ (Si-CH$_3$), 1207 and 947 cm$^{-1}$ (Si-CH$_2$-Si and Si-CH$_3$), 944 and 531 cm$^{-1}$ (Si-C and Si-CH$_3$), and 531 and 444 cm$^{-1}$ (Si-Si-C$_6$H$_5$) in infrared absorption spectra of a typical polydimethylsilane polymer (PS), polycarbosilane polymer (PCS), polysilastyrene polymer (PSS), and polycarbosilastyrene copolymer PCSS having the formulae:

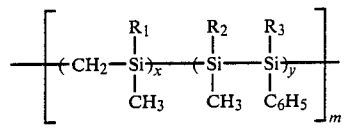

TABLE 1

| | INFRARED ABSORPTION AREA PERCENTAGE | | | | | | | |
|---|---|---|---|---|---|---|---|---|
| No. | 1 | 2 | 3 | 4 | 5 | 6 | 7 | 8 |
| Functional bond | C$_6$H$_5$—Si | Aliphatic bond | Si—H | Si—CH$_3$ | Si—CH$_3$ Si—C—Si | Si—C Si—CH$_3$ | —Si—Si—C$_6$H$_5$ | Total (%) |
| Wave number (cm$^{-1}$) | 3112-2998 | 2998-2744 | 2230-1985 | 1286-1207 | 1207-944 | 944-531 | 531-444 | |
| Polydimethylsilane (PS) | 0.0 | 22.9 | 0.0 | 7.2 | 2.7 | 67.2 | 0.0 | 100.0 |
| Polycarbosilane (PCS) | 0.0 | 5.9 to 7.5 | 9.8 to 14 | 4.5 to 5.2 | 18.3 to 13.3 | 61.5 to 59.8 | 0.0 | 100.0 |
| Polysilastyrene (PSS) | 5.6 | 12.3 | 0.1 | 5.3 | 13.9 | 58.2 | 4.6 | 100.0 |
| Polycarbosilastyrene copolymer (PCSS) | 4.4 | 9.0 | 5.3 | 4.6 | 14.4 | 60.7 | 1.6 | 100.0 | bond and determined in the above-mentioned manner is 100, it is confirmed that the percentage of the absorption area (SiP$_p$) of the Si-C$_6$H$_5$ bond appearing between wave numbers of 3112 cm$^{-1}$ and 2744 cm$^{-1}$ to the sum (S) is in the range of from 0.5 to 4, the percentage of the absorption area (SiH$_p$) of the Si-H bond appearing between wave numbers of 2230 cm$^{-1}$ and 1985 cm$^{-1}$ to the sum (S) is in the range of from 1 to 9, and the percentage of the absorption area (SiII$_p$) of Table 1 shows that, in the infrared absorption spectrum of the polycarbosilane polymer consisting of recurring carbosilane units (—CH$_2$—Si—), the absorption area percentage of the silicon-hydrogen (Si-H) bond is in the range of from 9.8 to 14.

In view of Table 1, it is clear that the polycarbosilastyrene copolymer of the present invention can be definitely distinguished from the corresponding polysilastyrene polymer from which the polycarbosilastyrene copolymer is produced, polycarbosilane which is produced as a by-product in the conversion reaction of the polysilastyrene to the corresponding polycarbosilastyrene, and polydimethylsilane from which the polycarbosilane is produced, by means of the infrared absorption spectrum analysis. Also, the chemical structure of the polycarbosilastyrene of the present invention can be identified by the results of the infrared absorption spectrum analysis thereof.

Particularly, the chemical structure of the polycarbosilastyrene of the present invention can be made clear from the absorption bond and absorption area percentage ($SiP_p$) of the $Si-C_6H_5$ bond appearing between wave numbers of 3112 and 2998 cm$^{-1}$, the absorption bond and absorption area percentage ($SiH_p$) of the Si-H bond appearing between wave numbers of 2230 and 1985 cm$^{-1}$, and the absorption bond and absorption area percentage ($SiII_p$) of the

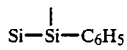

bond appearing between wave numbers of 531 and 444 cm$^{-1}$, In other words, the polycarbosilastyrene copolymer of the present invention can be identified by determining the above-mentioned three absorption area percentages $SiP_p$, $SiH_p$, and $SiII_p$.

The polycarbosilastyrene of the present invention is preferably produced from a polysilastyrene having an $SiP_M$ of from 5 to 6%, an $SiH_M$ of 0 to 0.2% and an $SiII_M$ of 3.5% to 5%, and preferably has an $SiP_p$ of 0.5% to 6%, more preferably 1.5 to 5%, an $SiH_p$ of 1% to 9%, more preferably 2% to 8%, and an $SiII_p$ of from 0.3 to 3.5%, more preferably 0.5 to 3%. In the conversion of the polysilastyrene to the polycarbosilastyrene, a by-product, polycarbosilane, usually has an absorption area of 9.5 to 14 between wave numbers of 2230 and 1985 cm$^{-1}$.

When the value of $SiP_p$ is less than 0.5, that is, the content of benzene ring in the polycarbosilastyrene copolymer molecule is excessively small, the copolymer has an easy cross-linking property but exhibits a poor shaping or spinning property.

When the value of $SiP_p$ is more than 6%, that is, the content of benzene ring is excessively large, the copolymer exhibits easy fusing and deforming properties in the cross-linking step.

When the value of $SiH_p$ is less than 1%, the resultant copolymer exhibits an excellent shaping (spinning) property in the shaping step but undesirable easy fusing and deforming properties in the cross-linking step.

When the value of $SiH_p$ is more than 9%, the shaping procedure applied to the copolymer causes undesirable non-fusible substances to be produced and these substances cause the shaping property of the copolymer to be remarkably decreased.

When the value $SiII_p$ is less than 0.3%, that is, the content of the

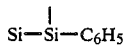

bond in the copolymer molecule is excessively small, the copolymer exhibits an easy cross-linking property but a very poor shaping property, and is too easily converted to a cross-linked, non-fusible substance.

If the value of $SiII_p$ is more than 3.5%, the shaped copolymer material is easily fused and/or deformed in the cross-linking and sintering steps.

The chemical structure of the polycarbosilastyrene copolymer of the present invention is variable, depending on that of the polysilastyrene polymer from which the polycarbosilastyrene is produced.

When the absorption area percentage of the $Si-C_6H_5$ bond appearing between the wave numbers of 3112 and 2998 cm$^{-1}$, of the Si-H between 2230 and 1985 cm$^{-1}$, and of the

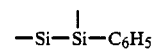

bond appearing between 551 and 444 cm$^{-1}$ are respectively represented by $SiP_M$, $SiH_M$, and $SiII_M$, it is preferable that the ratio in % $SiP_O$ of $SiP_p$ to $SiP_M$, that is $SiP_O = SiP_p/SiP_M \times 100$, be in the range of from 20% to 90%, more preferably from 30% to 85%, and the ratio in % $SiII_O$ of $SiII_p$ to $SiII_M$, that is, $SiII_O = SiII_p/SiII_M \times 100$, be in the range of from 10% to 85%, more preferably from 20 to 75%, still more preferably from 30% to 70%.

Since the polysilastyrene contains substantially no Si-H bond, the value of $SiH_M$ is substantially zero, and therefore, the ratio in % $SiH_O$ of $SiH_p$ to $SiH_M$, that is, $SiH_O = SiH_p/SiH_M \times 100$ is usually not used.

The polycarbosilastyrene copolymer of the present invention must have a number average molecular weight of 1,000 or more, preferably from 1,000 to 500,000.

If the molecular weight is less than 1,000, the resultant polycarbosilastyrene exhibits an unsatisfactory shaping property, the resultant shaped article exhibits a poor mechanical strength and dimensional stability, and the resultant shaped silicon carbide article exhibits a poor mechanical strength.

The polycarbosilastyrene copolymer can be produced from a polysilastyrene by the method of the present invention in which a heat treatment, an ultra-violet ray treatment, or both the heat treatment and the ultra-violet ray treatment, is applied to the polysilastyrene.

The polysilastyrene can be easily produced by bringing dichlorodimethylsilane into reaction with dichloromethylphenylsilane or dichlorodiphenylsilane in an inert medium consisting of toluene or xylene in the presence of a sodium catalyst at an elevated temperature higher than the melting point of the resultant polysilastyrene. The method is disclosed, for example, in U.S. Pat. No. 2,563,005 and U.S. Pat. No. 4,324,901 (corresponding to Japanese unexamined patent International publication (Kohyo) No. 58-500717, internationally published on November 11, 1982).

In the polysilastyrene represented by the formula:

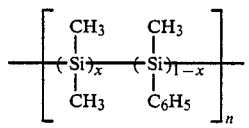

preferably x represents a positive number of from 0.3 to 0.7, more preferably from 0.4 to 0.6, usually from 0.45 to 0.55, and n represents an integer of 10 or more but not more than 3000.

In the polysilastyrene represented by the formula:

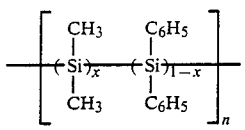

preferably x represents a positive number of from 0.2 to 0.8, more preferably from 0.4 to 0.6, usually from 0.45 to 0.55, and n represents an integer of from 10 to 3000.

The heat treatment to be applied to the polysilastyrene is usually carried out at a temperature of from 350° C. to 550° C., preferably from 380° C. to 480° C., for 10 minutes to 10 hours. The heat treatment time is variable depending on the heat treating temperature.

For example, if the heat treatment is carried out at a low temperature of 350° C., a long time of from 5 hours to 10 hours is necessary to complete the treatment. If, however, the heat treatment temperature is 550° C., the treatment can be completed within 10 minutes. If the heat treatment is carried out for an excessively long time, for example, more than 10 minutes, at a temperature of 550° C., the resultant polycarbosilastyrene copolymer may exhibit an undesirably increased softening temperature. This too high softening temperature of the copolymer results in the undesirable necessity for a high shaping temperature of, for example, more than 300° C. This high shaping temperature causes the production of a non-fusible substance from the copolymer, and this phenomenon makes the shaping procedure difficult. Accordingly, when the heat treatment temperature is about 500° C., the treatment time is preferably from 3 to 5 minutes. Note, the heat treatment time is 20 to 60 minutes at 400° C., and 8 to 15 minutes at 450° C.

The heat treatment is carried out in an inert gas atmosphere, for example, a nitrogen atmosphere, at a temperature of 350° C. to 550° C., preferably from 380° C. to 480° C. During the process of elevating the temperature of the reaction system to a desired level, low boiling point substances are evaporated or distilled from the reaction system. The low boiling point substances consist of low molecular weight silane compounds. The low molecular weight silane compounds can be evaporated or distilled from the reaction system by gas-tightly sealing the reaction system, heating the gas-tight system under a gauge pressure of from several kg/cm² to ten and several kg/cm² at a desired heat treatment temperature, and reducing the presence of the reaction system to atmospheric pressure.

The evaporated low molecular weight silane compounds are collected at the outside of the reaction system and recycled into the reaction system. Usually, the low molecular weight silane compounds to be recycled are those having a boiling temperature of 200° C. or more under atmospheric pressure. The recycled low molecular weight silane compounds are effective for increasing the yield of the polycarbosilastyrene copolymer.

Other low molecular weight silane compounds having a boiling temperature lower than 200° C. do not contribute to any increase in the yield of the polycarbosilastyrene copolymer. Accordingly, it is preferable to recycle the evaporated low molecular weight silane compounds having a boiling point of 200° C. or more, more preferably 250° C. or more.

The conversion of the polysilastyrene to the polycarbosilastyrene copolymer can be effected by applying an ultra-violet ray treatment, for example, using an ultra-violet ray lamp at an output power of from 5 to 1000 W/cm, at a temperature of from 20° to 200° C.

The ultra-violet ray treatment time is variable, depending on the intensity of the ultra-violet ray radiation. For example, when a lamp having an output power of 5 W/cm is used, the treatment time is preferably an output power of 100 to 500 W/cm needs a treatment time of 10 seconds to 100 minutes.

When the heat treatment or the ultra-violet ray treatment is applied to the polysilastyrene, a portion of the polysilastyrene molecule is decomposed to generate benzene, which has a low boiling temperature and is easily evaporated from the reaction system, methyl radicals in the polysilastyrene molecule are rearranged to generate carbosilane units. Also, a portion of the resultant copolymer molecules may be intermolecularly cross-linked to increase the molecular weight, the softening point, and the necessary shaping temperature thereof.

Also, the polycarbosilastyrene copolymer molecules may contain titanium, zirconium, and/or boron atom-containing organic radicals as cross-linking constituents.

The polycarbosilastyrene copolymer of the present invention also can be produced by heat-treatment of polysilmethylenesilastyrene copolymer. The copolyemr can be produced by the poly-condensation of monochloromethyldimethylchlorosilane with dichloromethylphenylsilane or dichlorodiphenylsilane in an inert medium consisting of, for example, toluene or xylene, in the presence of an alkali metal catalyst, for example, a sodium catalyst, at a temperature equal to or higher than the melting point of the alkali metal catalyst, and then by heat-treating the polycondensation product, that is, polysilmethylenesilastyrene copolymer, at a temperature of from 350° C. to 500° C. in an inert gas atmosphere, for example, a nitrogen gas atmosphere, to provide a polycarbosilastyrene copolymer.

The polycondensation is carried out preferably at a temperature of 50° C. or more, more preferably from 100° C. to 150° C. The molar ratio of dichloromethylphenylsilane or dichlorodiphenylsilane to monochloromethyldimethylchlorosilane is preferably in the range of from 10/1 to 1/5, more preferably from 5/1 to ⅓.

A shaped, sintered silicon carbide article can be produced from a feed comprising a polycarbosilastyrene copolymer in accordance with the process of the present invention.

The feed may consist of a polycarbosilastyrene copolymer alone or of a mixture of a polycarbosilastyrene copolymer with an additive. The additive may be silicon carbide powder.

In the process of the present invention, a feed comprising the polycarbosilastyrene copolymer comprising recurring carbosilane units

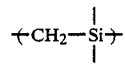

and recurring silastyrene units

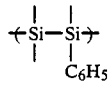

and having a number average molecular weight of at least 1,000, preferably from 1,000 to 500,000, is shaped (molded) into a desired form, for example, a filament or film, and the resultant polycarbosilastyrene copolymer article is subjected to an ultra-violet ray treatment or a heat treatment, whereby the polycarbosilastyrene copolymer article is cross-linked and made non-fusible, and then the non-fusible article is sintered at an elevated temperature to provide a sintered silicon carbide article.

The shaping (molding) procedure for the polycarbosilastyrene copolymer feed is carried out by any conventional shaping (molding) method, for example, molding, compression molding, injection molding, and extrusion molding. The feed can be shaped in the state of a melt, a dope, or a slurry.

Also, the shaping procedure includes film-forming and filament forming procedures. That is, the shaping (molding) procedure includes melt-shaping (molding) and dry-shaping procedures. The melt-shaping (molding) procedure includes melt-spinning and melt-film forming procedures. Also, the dry-shaping procedure includes a dry-spinning procedure and a dry film forming procedure.

In the melt-shaping procedure, a polycarbosilastyrene copolymer feed is melted, the melt is shaped into a desired form by, for example, a melt-spinning procedure, and the shaped melt article is cooled and solidified.

In the dry-shaping procedure, a polycarbosilastyrene feed is dissolved in an organic volatile solvent, the resultant dope is shaped into a desired form by, for example, a dry-spinning procedure, and the shaped article is dried by evaporating the volatile solvent from the shaped article.

A preferable shaping procedure for the polycarbosilastyrene copolymer is the melt-shaping procedure.

The melt-shaped polycarbosilastyrene copolymer article is advantageous in that, when it is subjected to a heat treatment or ultra-violet ray treatment, the shrinkage of the article is very small and substantially negligible in this step and subsequent steps, and when the shaped article is of melt-spun filaments, no meltbonding is found between the melt-spun filaments. Also, the shaped heat and or ultra-violet ray treated article is insoluble in a solvent, for example, tetrahydrofuran or toluene, and has a high stability in dimensions and shape.

When a mixture of a polysilastyrene and polycarbosilane in equal amounts to each other is shaped to a desired form, for example, a filament, and the shaped article is treated with ultra-violet ray radiation at room temperature, the shrinkage of the shaped article is very small and no melt-bonding is found in the shaped article. However, the shaped, ultra-violet ray treated article is easily dissolved in a solvent, for example, tetrahydrofuran or toluene.

That is, it is clear that the polycarbosilastyrene copolymer of the present invention is definitely distinguished from a mere mixture of a polysilastyrene and a polycarbosilane. That is, the polycarbosilastyrene copolymer has a recurring carbosilane structure

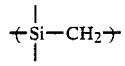

and a recurring silastyrene structure

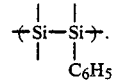

The above-mentioned two types of recurring structures are confirmed to be contained in the polycarbosilastyrene copolymer molecules by means of a infrared absorption spectrum analysis and an NMR spectrum analysis.

In the process for melt-spinning the polycarbosilastyrene copolymer, the copolymer is melted, the melt is extruded through a spinneret at a temperature of from 150° C. to 350° C., the resultant filamentary streams of the melt are solidified by cooling, and the solid filaments are taken up at a speed of from 200 to 1000 m/min.

The polycarbosilastyrene copolymer to be melt-spun is preferably selected from those which can be melt-spun at a temperature of from 150° C. to 350° C., more preferably 170° C. to 300° C.

When a polycarbosilastyrene copolymer which can be melt-spun at a temperature lower than 150° C. is melt-spun, and cross-linked by the heat treatment, ultra-violet ray treatment, or both the heat treatment and the ultraviolet ray treatment, the resultant filaments exhibit a large shrinkage and are sometimes melt-bonded to each other.

When a polycarbosilastyrene copolymer which can be melt-spun only at a temperature higher than 350° C. is melt-spun, the copolymer sometimes becomes non-fusible and/or is gelled during the melt-spinning and, therefore, is useless for the melt-spinning process.

The shaped polycarbosilastyrene copolymer article, for example, filament or film, is cross-linked and made non-fusible by applying a heat treatment and/or an ultra-violet ray treatment.

The ultra-violet ray treatment is preferably carried out at a temperature between room temperature and 300° C., more preferably from 10° C. to 100° C., in the air atmosphere or an inert gas atmosphere substantially free from molecular oxygen. When the ultra-violet ray treatment temperature is 80° C. or more, the treatment is preferably carried out in the inert gas atmosphere. The inert atmosphere may be under a vacuum condition or under a reduced air pressure condition. Also, the inert atmosphere may consist of an inert gas selected from nitrogen, hydrogen, argon, and helium gases.

Also, the shaped polycarbosilastyrene copolymer article can be cross-linked and made non-fusible by applying a heat treatment to the shaped, cross-linked polycarbosilastyrene copolymer article at a temperature of from 50° C. to 300° C., preferably from 100° C. to 200° C. The heat treatment can be carried out in the air atmosphere or, preferably, under vacuum or a reduced pressure, or in an inert atmosphere consisting of hydrogen, air or nitrogen gas.

In the heat treatment, it is preferable that, in a temperature range of from 50° C. to 100° C., the temperature be elevated at a temperature-elevating rate of 5° C./min, and then the temperature maintained at 100° C. for 10 to 60 minutes. Alternatively, the temperature is elevated at a rate of 2°/min to a level of 200° C. and then maintained at 200° C. for 20 to 300 minutes.

The shaped, cross-linked, non-fusible article is sintered at a temperature of from 800° C. to 1400° C. is an inert gas atmosphere containing nitrogen, argon or helium gas to provide a shaped, sintered silicon carbide article.

In the sintering procedure, preferably the temperature is elevated at a rate of from 1° C./min to 10° C./min in the range of from 200° C. to 800° C., and then the sintering temperature maintained at a desired level of from 800° C. to 1400° C. for 0.5 to 5 hours.

When the shaped article is a filament or a film, the sintering temperature is preferably in the range of from 800° C. to 1200° C.

In the process of the present invention, the shaped, sintered silicon carbide article can be produced from the polycarbosilastyrene polymer at a high yield of 70% to 90%, whereas the yield of the shaped, sintered silicon carbide article from polycarbosilane polymer or polysilastyrene polymer in accordance with a conventional process is about 30% to 60%.

The polycarbosilastyrene copolymer feed for the process of the present invention may contain silicon carbide powder in an amount of 90% by weight or less, preferably, from 20% to 80% by weight. In the molding step, the polycarbosilastyrene copolymer serves as a binder for the silicon carbide powder. The polycarbosilastyrene copolymer feed may be free from the silicon carbide powder.

The feed may contain a small amount, for example, 5% by weight or less, of at least one member selected from inorganic oxide powders, for example, $SiO_2$, $TiO_2$, ZnO, PbO, and $B_2O_3$ powders, and metal powders, for example, B, Si, Pb, and Zn powders. These inorganic oxide and metal powders are effective for enhancing the mechanical strength of the resultant articles.

Also, the feed may contain a polymeric additive, for example, polyvinyl alcohol, polyethylene oxide, polypropylene oxide, or polyethylene glycol, which can be completely decomposed by a gaseous substance in the sintering step and completely removed from the sintering system, and which is effective for enhancing the shaping (molding) property of the feed.

The polycarbosilastyrene copolymer can be mixed with the above-mentioned additive by a usual dry blender, or a usual wet blender in which the polycarbosilastyrene copolymer is dissolved in an organic solvent and the additive is dispersed in the resultant solution.

The process of the present invention for producing a shaped (molded), sintered silicon carbide article is advantageous in that a shaped (molded), silicon carbide article can be produced from a polycarbosilastyrene copolymer alone at a high efficiency, the sintering time can be shortened while increasing the productivity of the sintered article, the undesirable melt-bonding, foaming, cracking and deformation of the shaped (molded) article during the cross-linking step and the sintering step can be prevented, and the resultant shaped (molded) sintered article has a high mechanical strength and dimensional stability.

The present invention will be illustrated in detail by means of the following examples and comparative examples.

EXAMPLE 1

A polysilastyrene having a softening point of 86° C. to 94° C. was prepared by polycondensing dichlorodimethylsilane and dichloromethylphenyl silane in the same molar amounts in a reaction medium consisting of toluene in the presence of a sodium catalyst dispersed in the medium at a temperature of 110° C. for 10 hours.

The polysilastyrene was converted to a polycarbosilastyrene having a softening point of 175° C. to 185° C. by applying a heat treatment at a temperature of 410° C. for 15 minutes under a reduced pressure.

It was confirmed by means of an infrared absorption spectrum analysis and an NMR analysis that, in the resultant polycarbosilastyrene copolymer, the molar ratio of the recurring carbosilane units to the recurring silastyrene units was 35/45. The copolymer had a number average molecular weight of 4500.

EXAMPLE 2

A polysilastyrene polymer having a softening point of 96° to 105° C. was prepared by the polycondensation of dichlorodimethylsilane and dichloromethylphenylsilane in the same molar amounts in a xylene medium in the presence of a sodium catalyst dispersed in the medium at a temperature of 110° C.

The resultant reaction mixture containing polysilastyrene polymer was heated at a temperature of 415° C. under the ambient atmospheric pressure for 15 minutes while the mixture was stirred, and then at the same temperature as mentioned above under a reduced pressure of 3 to 10 mmHg for 5 minutes while the generated low boiling point substances were removed. By the above-mentioned heat treatment, the polysilastyrene polymer was converted to a polycarbosilastyrene copolymer having a melting point of 120° C. to 130° C.

It was confirmed by means of the infrared absorption spectrum analysis and the NMR analysis that the molar ratio of the recurring carbosilane units and the recurring silastyrene units in the copolymer was 30/70. The copolymer had a number average molecular weight of 4200.

EXAMPLE 3

In accordance with the same procedures as those described in Example 1, a polysilastyrene having a softening point of 80° C. to 85° C. was produced by the polycondensation of 0.45 equivalent weight of dimethyldichlorosilane with 0.55 equivalent weight of dichloromethylphenylsilane. The resultant polysilastyrene polymer exhibited the following infrared absorption area percentages corresponding to the Si-$C_6H_5$ bond appearing between wave numbers of 3112 and 2998 cm$^{-1}$ (SiP$_M$), to the Si-H bond appearing between wave numbers of 2288 and 1985 cm$^{-1}$ (SiH$_M$), and to the

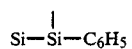

bond appearing between wave numbers of 531 and 444 cm$^{-1}$ (SiII$_M$).

SiP$_M$=5.4%
SiH$_M$=0.2%
SiII$_M$=2.4%

The polysilastyrene polymer was heat-treated at a temperature of 420° C. under the ambient atmospheric pressure for 30 minutes, and then at the same temperature as mentioned above under a reduced pressure of 3 to 10 mmHg for 5 minutes.

The resultant polycarbosilastyrene copolymer had a softening point of 210° C. to 220° C. and a number average molecular weight of 4700.

It was confirmed by the means of an infrared absorption spectrum analysis and an NMR analysis that the molar ratio of the recurring carbosilane units to the recurring silastyrene units was 45/55.

The polycarbosilastyrene copolymer could be melt-spun at a temperature of 220° C. to 260° C. when taking-up at a speed of 400 m/min. At a melt-spinning temperature of 230° C., the melt-spinning procedures for the poly-carbosilastyrene copolymer could be effected without difficulty at up to a maximum taking-up speed of 2000 m/min. That is, the polycarbosilastyrene copolymer exhibited an excellent shaping, especially melt-spinning, property.

EXAMPLE 4

The same polysilastyrene having a softening point of 80° to 85° C. as that described in Example 1 was subjected to an ultra-violet ray treatment using two ultra-violet ray lamps each having an output power of 160 W/cm, at a temperature of 100° C. under a reduced pressure of 2~3 mmHg for 5 hours.

The resultant polycarbosilastyrene copolymer had a softening point of 110° C. to 115° C., which was 30° C. above that of the polysilastyrene polymer, and a number average molecular weight of 3300.

It was confirmed by means of an NMR analysis and infrared absorption spectrum analysis that the molar ratio of the carbosilane units to the silastyrenre units was 30/70.

The polycarbosilastyrene copolymer exhibited a satisfactory melt-spinning property such that when melt-spun at a taking-up speed of 400 m/min, the melt-spinning temperature was in the range of from 145° C. to 185° C.

EXAMPLE 5

The same polycarbosilastyrene copolymer having a number average molecular weight of 4500 as that described in Example 1 could be smoothly melt-spun without difficulty at a temperature of 200° to 240° C. at a taking-up speed of 200 to 600 m/min.

The resultant polycarbosilastyrene copolymer filament, which was melt-spun at a taking-up speed of 400 m/min at a temperature of 220° C. and had a thickness of 12 μm, was treated with ultra-violet ray radiation using a lamp having an output power of 160 W/cm, at a temperature of 20° C. for one hour. The treated filament exhibited substantially no shrinkage and no fusion.

The ultra-violet ray treated filament was sintered in a nitrogen gas atmosphere by elevating the temperature of the atmosphere at a heating rate of 300° C./hour from 350° C. to 800° C., by maintaining the temperature of the atmosphere at 800° C. for 30 minutes, by elevating the atmosphere temperature at a rate of 400° C./hour from 800° C. to 1200° C., and finally, by maintaining the atmosphere temperature at 1200° C. for one hour.

During the sintering procedure, the filaments exhibited a shrinkage of 81% but were not fuse-bonded to each other. The resultant sintered silicon carbide filaments were completely independent from each other. It was confirmed by an X-ray analysis that the filament consisted of silicon carbide (SiC) in a β-crystalline structure. The filaments had a diameter of 8 to 10 μm, a tensile strength of 318 kg/mm², and an elastic modulus in tension of 19 T/mm².

EXAMPLE 6

A polycondensation of dimethyldichlorosilane and methylphenyldichlorosilane in the same molar amounts was carried out in a xylene medium in the presence of a dispersed sodium catalyst in an amount of 2.1 times the total molar amount of the above-mentioned silane co-monomers, at a temperature of 135° C. for 24 hours. A dark purple polycondensation mixture was obtained.

The polycondensation mixture was cooled to room temperature, was added with methyl alcohol to decompose non-reacted sodium catalyst, and was washed with water a plurality of times to remove methyl alcohol and sodium chloride therefrom. A milky liquid was obtained, and this milky liquid was filtered to remove about 5% by weight of solid deposit. The remaining liquid was a solution of resultant polysilastyrene polymer in xylene. The polysilastyrene polymer was isolated in a solid state in yield of about 90% by weight, by distilling off xylene.

The polysilastyrene polymer was gradually heat-treated at a temperature of 360° C. to 400° C. over a period of 60 minutes in a nitrogen atmosphere and then at the same temperature as mentioned above under a reduced pressure of 3 to 10 mm Hg for 5 minutes.

The resultant polycrbosilastyrene copolymer had a molar ratio of the carbosilane units to the silastyrene units of 50/50, a softening point of from 180° to 190°, and a number average molecular weight of 4000.

The polycarbosilastyrene copolymer exhibited an excellent melt-spinning property such that a melt-spinning operation at a taking-up speed of 400 m/min could be effected at a melt-spinning temperature of 220° C. to 310° C., and the maximum taking-up speed in the melt-spinning operation at a temperature of 240° C. was 1200 m/min.

COMPARATIVE EXAMPLE 1

A polycarbosilane having a softening point of 170° C. to 175° C. was melt-spun at a temperature of 185° C. to 190° C. and at a taking-up speed of 200 to 600 m/min.

The resultant polycarbosilane filaments were treated with ultra-violet ray radiation in the same manner as described in Example 5. No fuse-bonding of the filaments to each other was found. A portion of the treated polycarbosilane filaments was immersed in tetrahydrofuran or toluene. In each immersion procedure, it was found that the filaments were substantially completely dissolved and lost the filamentary form thereof.

The remaining portion of the treated polycarbosilane filaments was sintered in the same manner as mentioned in Example 5. It was found that the filaments were significantly shrunk and fuse-bonded to each other so that they lost the filamentary form thereof.

COMPARATIVE EXAMPLE 2

The same polysilastyrene polymer having a softening point of 85° C. to 94° C. as that described in Example 1 was melt-spun at a temperature of 140° to 150° C. and at a taking-up speed of 200 to 600 m/min.

When the resultant polysilastyrene polymer filaments were treated with the same ultra-violet ray radiation as described in Example 5, it was found that the filaments had significantly shrunk and fuse-bonded to each other and, therefore, could not be maintained in the filament form thereof.

COMPARATIVE EXAMPLE 3

The same polysilastyrene polymer having a softening point of 86° C. to 94° C. as described in Example 1 and the same polycarbosilane polymer having a softening point of 170° C. to 175° C. as described in Comparative Example 1, were mixed in the same molar amounts. The mixture was melt-spun at a temperature of 170° C. to 175° C. and at a taking-up speed of 200 to 600 m/min. The melt-spinning operation was smoothly carried out without difficulty.

The resultant filaments were treated with the ultra-violet ray radiation in the same manner as described in Example 5. It was found that the ultra-violet ray-treated filaments were readily dissolved in tetrahydrofuran or toluene, and could not maintain the filament form thereof. Also, it was confirmed that, in the mixture of the polycarbosilane polymer with the polysilastyrene, the effect of the ultra-violet ray treatment on the polysilastyrene did not appear.

EXAMPLE 7

Dichlorodimethylsilane and dichloromethylphenylsilane in the same molar amounts were polycondensed in a toluene medium in the presence of a sodium dispersion catalyst in an amount of 2.2 times the total molar amount of the above-mentioned silane comonomers at a temperature of 100° C. to 110° C., while refluxing the generated low boiling substance vapor. A dark purple reaction mixture was obtained.

The mixture was cooled to room temperature, was added with methyl alcohol to decompose non-reacted sodium catalyst, and then washed with water a plurality of times to eliminate methyl alcohol and sodium chloride from the mixture.

A milky mixture was obtained, and this milky mixture was filtered to remove solid deposits therefrom. A clear solution, which is a solution of the resultant polysilastyrene in toluene, was added with a large amount of a mixture liquid of 4 parts by volume of methyl alcohol with 1 part by volume of isopropyl alcohol to cause a white solid substance to deposit. The white solid substance was separated from the solution and dried. A polysilastyrene polymer having a softening point of 96° C. to 104° C. was obtained at a theoretical yield of 45%.

The resultant polysilastyrene polymer (PSS) in an amount of 100 equivalent weight was heat treated in an inert gas under the conditions as indicated in Table 2, and then at a temperature of 380° C. under a reduced pressure of 3 to 10 mmHg for 5 minutes, while low boiling point substances were distilled.

The above-mentioned heat treatment was repeated five times while the distilled low boiling point substances obtained from the foregoing treatment system were recycled to the following treatment system, as shown in Table 2. Also, in each heat treatment, the resultant polycarbosilastyrene copolymer (PCSS) was separated from the heat treatment system and the residue was recycled to the next heat treatment system, as shown in Table 2.

The yield of the polycarbosilastyrene copolymer in each heat treatment is shown in Table 2.

TABLE 2

| Heat treatment No. | 1 | 2 | 3 | 4 | 5 |
|---|---|---|---|---|---|
| Amount of PSS (equivalent weight) | 100 | 100 | 100 | 100 | 100 |
| Amount of recycled PSS (equivalent weight) | — | 59 | 63.9 | 65.5 | 63 |
| Heat treatment temperature (°C.) | 230–400 | 230–400 | 230–400 | 230–400 | 230–400 |
| Heat treatment time (min) | 65 | 67 | 66 | 66 | 65 |
| Amount of primary distilled fraction at up to 230° C. (equivalent weight) | ≦2.0 | 50.1 | 52.6 | 54.7 | 53.6 |
| Amount of secondary distilled fraction at 230 to 400° C. (equivalent weight) | 59.3 | 65.0 | 66.2 | 63.3 | 63.0 |
| Yield of PCSS (%) | 38.4 | 40.6 | 43.0 | 44.1 | 44.7 |
| Melt-spinning temperature (°C.) | 250 | 250 | 250 | 250 | 250 |
| Maximum taking-up speed (m/min) | 1500 | 1400 | 1400 | 1550 | 1450 |

Table 2 shows that, by recycling the distilled low boiling point substances, the yield of the polycarbosilastyrene copolymer was 38.4% in the first heat treatment and was increased to 44.7% in the fifth heat treatment.

The polycarbosilastyrene copolymer obtained in each heat treatment had a good melt-spinning property and could be melt-spun at a peak taking-up speed of between 1400 and 1550 m/min at a melt-spinning temperature of 250° C.

Each polycarbosilastyrene copolymer had a molar ratio of the carbosilane units to the silastyrene units of 45/55 and a number average molecular weight of 5000 to 5100.

EXAMPLE 8

A mixture of 0.45 equivalent weight of dichlorodimethylsilane with 0.55 equivalent weight of dichlorophenylmethylsilane was polycondensed in a toluene medium in the presence of a sodium dispersion catalyst in an amount of 2.1 times the total equivalent weight of the above-mentioned silane comonomers at a temperature of 100° to 110° C.

The mixture was cooled to room temperature, was added with methyl alcohol to decompose the non-reacted sodium catalyst, and then washed with water a plurality of times to remove methyl alcohol and sodium chloride. A milky mixture was obtained, and this milky mixture was filtered and then subjected to a super centrifugal separator to remove solid deposits from the mixture. A clear solution of the resultant polysilastyrene in toluene was obtained. The clear solution was subjected to an evaporation procedure to remove toluene. The polysilastyrene polymer was obtained at a theoretical yield of 95%. The polysilastyrene polymer was subjected to the same heat treatment procedure as that mentioned in Example 7.

In the first heat treatment, polycarbosilastyrene copolymer was obtained at an yield of 32% based on the weight of the fresh polysilastyrene polymer and in the second, third, fourth, and fifth heat treatments, in each of which treatments the distilled fractions at a temperature of 200° C. to 400° C. in the foregoing treatment were recycled to the following treatment, the yields of the polycarbosilastyrene copolymer were 34% (second), 35.6% (third), 37.8% (fourth), and 38.2% (fifth), based on the weight of the fresh polysilastyrene polymer used in each treatment. That is, the yield of the copolymer was increased by repeating the heat treatment.

The polycarbosilastyrene copolymer obtained in the heat treatments exhibited an excellent melt-spinning property such that the copolymer could be melt-spun at a temperature of 245° C. at a taking-up speed of up to 1400 m/min, and had a molar ratio of the carbosilane units to the silastyrene units of 45/55 and a number average molecular weight of 5050.

The polycarbosilastyrene copolymer filaments were treated with an ultra-violet ray radiation using a lamp having an output power of 100 W/cm at a temperature of 20° C. in air atmosphere for 60 minutes. The resultant non-fusible filaments were sintered in a nitrogen atmosphere at a temperature of 200° C. to 1200° C. The resultant sintered silicon carbide filaments had a high tensile strength of 310 kg/mm$^2$.

EXAMPLE 9

The same procedure as that described in Example 1 was carried out except that the dichloromethylphenylsilane was replaced by dichlorodiphenylsilane, and the resultant polysilastyrene polymer had a softening point of 81° to 91° C.

The polysilastyrene polymer was heat treated in a nitrogen gas atmosphere at a temperature of 420° C. for 30 minutes under reflux, and then at the same temperature as mentioned above under a reduced pressure of 2 to 3 mmHg for 15 minutes. The resultant polycarbosilastyrene copolymer had a molar ratio of the recurring carbosilane units to the recurring silastyrene units of 45/55, a softening point of 200° to 210° C., and a number average molecular weight of 4500.

The polycarbosilastyrene copolymer had an excellent melt-spinning property such that the melt-spinning procedure could be smoothly carried out at a melt-spinning temperature of 220° to 230° C. and at a taking-up speed of 600 to 1300 m/min.

The polycarbosilastyrene copolymer filaments which were produced by means of a melt-spinning at a temperature of 240° C. at a taking-up speed of 600 m/min, were treated with an ultra-violet ray radiation using a lamp having an output power of 100 W/cm in the air atmosphere at a temperature of 20° C. for one hour, and then under a reduced pressure of 1 mmHg for 3 hours. During this treatment, substantially no shrinkage and no fuse-bonding were found on the filaments.

The non-fusible filaments were sintered in a nitrogen gas atmosphere in such a manner that the filaments were left at a temperature of 350° C. for one hour, were heated at a rate of 200° C./hour between 350° C. and 800° C., then at a rate of 300° C./hour between 800° C. and 1200° C., and finally, were left at a temperature of 1200° C. for 30 minutes. No fuse-bonding of the filaments to each other was found.

It was confirmed by means of an X-ray analysis that the resultant sintered filaments had a β-silicon carbide crystalline structure.

The sintered filaments had a diameter of 7 to 9 μm, a tensile strength of 320 kg/mm$^2$, and an elastic modulus in tension of 18 T/mm$^2$.

EXAMPLE 10

A polysilastyrene having a softening point of 78° to 84° C. was produced by polycondensing 0.45 equivalent weight of dimethyldichlorosilane with 0.55 equivalent weight of dichloromethylphenylsilane in a toluene medium in the presence of a dispersed sodium catalyst.

The polysilastyrene polymer was heat-treated in a nitrogen gas atmosphere at a temperature of 430° C. for 20 minutes and then at the same temperature as mentioned above under a reduced pressure of 3 to 10 mmHg for 5 minutes to provide a polycarbosilastyrene copolymer having a softening point of an approximately 190° to 210° C., a number average molecular weight of 4500, and a molar ratio of the recurring carbosilane units to the recurring silastyrene units of 43/57.

The polycarbosilastyrene copolymer could be smoothly melt-spun at a temperature of 220° to 260° C. and at a taking-up speed of 230 to 600 m/min.

The polycarbosilastyrene copolymer filaments were treated with an ultra-violet ray radiation at an output power of 80 W/cm at a temperature of 20° C. for one hour, in a nitrogen gas atmosphere.

The resultant non-fusible filaments were sintered in a nitrogen gas atmosphere in such a manner that the filaments were heated at a heating rate of 400° C./hour from 250° C. to 800° C., and then at a heating rate of 500° C./hour from 800° C. to 1200° C., and were left at 1200° C. for 30 minutes.

The resultant sintered filaments had a thickness of 7 to 8 μm, a tensile strength of 305 kg/mm$^2$, and an elastic modulus in tension of 18 T/mm$^2$.

EXAMPLE 11

The same polycarbosilastyrene copolymer as that described in Example 10 was melt-extruded through a slit at a temperature of 230° C. and the resultant film stream of the melt was cooled on a cooling drum to provided a polycarbosilastyrene copolymer film having a thickness of 30 μm.

The film was treated with the same ultra-violet ray radiation as that mentioned in Example 10 at room temperature under a reduced pressure for one hour.

The resultant non-fusible film was sintered in the same manner as that described in Example 10.

The resultant sintered film was a silicon carbide film having a thickness of 15 μm.

EXAMPLE 12

The same polycarbosilastyrene copolymer having a number average molecular weight of 4500 as that described in Example 10 was melted at a temperature of 230° C. and was injection molded to provided specimens in a dumbell form.

The dumbell specimens were heat treated in the air atmosphere in such a manner that the temperature was gradually elevated from 100° C. to 300° C. for 3 hours.

The resultant non-fusible specimens were sintered by heating at a heating rate of 600° C./hr from 300° C. to 1200° C. and by heating at 1200° C. for one hour.

The sintered specimens consisted of sintered silicone carbide in a β-crystalline structure and exhibited a compression strength of 4850 kg/cm$^2$.

It was confirmed that the sintered specimens were completely free from cells or voids and cracks.

EXAMPLE 13

A polysilastyrene polymer having a softening point of from 78° C. to 84° C. was prepared by the polycondensation of 0.45 equivalent weight of dimethyldichlorosilane with 0.55 equivalent weight of dichloromethylphenylsilane in a toluene medium in the presence of a sodium dispersion catalyst.

The polysilastyrene polymer was treated with ultraviolet ray radiation at a temperature of 30° C. under a reduced pressure for 2 hours.

The resultant polycarbosilastyrene copolymer having a softening point of 160° to 170° C., a number average molecular weight of 3200 was dissolved in toluene and the solution was mixed with silicon carbide powder which was obtained from the commercial market in a weight ratio of the copolymer to the powder, of 1/9 to prepare a dispersion. The dispersion was dried by evaporating the solvent (toluene). The resultant mixture was molded in a metal mold.

The molded article was heated in the air atmosphere by gradually elevating the temperature of the article from 100° C. to 350° C. for 4 hours to cross-link and make the copolymer non-fusible.

The heated article was sintered in a nitrogen gas atmosphere in such a manner that the article was heated in the temperature range of from 200° C. to 600° C. at a heating rate of 400° C./hr, and in the range of from 600° C. to 1600° C. at a heating rate of 500° C./hr, and then was heated at a temperature of 1600° C. for one hour.

The sintered article consisted of 100% by weight of sintered silicon carbide and exhibited a high compression strength of 6900 kg/cm$^2$ and a good appearance.

EXAMPLE 14

The same polysilastyrene polymer having a softening point of 84° to 94° C. as that described in Example 1 was heat treated in a nitrogen gas atmosphere at a temperature of 430° C. for 10 minutes, and then at the same temperature as mentioned above under a reduced pressure of 3 to 10 mmHg for 5 minutes. In the last stage of the heat treatment, the generated low boiling point substances were distilled and removed under a reduced pressure.

The resultant polycarbosilastyrene copolymer had a softening point of 180° C. to 190° C. and a number average molecular weight of 3250.

The copolymer was finely pulverized.

The resultant fine particles of the copolymer in an amount of 5 parts by weight was uniformly mixed with 95 parts by weight of fine particles of silicon carbide which were obtained from the commercial market. The mixture was molded in a metal mold.

The resultant molded article was heat-treated in the air atmosphere at a temperature range of from 150° C. to 450° C. for 2 hours while gradually elevating the temperature of the article, to cross-link and modify the polycarbosilastyrene copolymer to a non-fusible state. The heat-treated article was sintered in a nitrogen gas atmosphere by elevating the temperature of the article from 600° C. to 1500° C. at a rate of 600° C./hr and by leaving the article at a temperature of 1500° C. for one hour.

The resultant sintered article completely consisted of sintered silicon carbide and exhibited a high compression strength of 7100 kg/cm$^2$ and a good appearance.

EXAMPLE 15

The same polysilastyrene polymer having a softening point of 86° C. to 94° C. as that described in Example 1 was heat-treated in a nitrogen gas atmosphere at a temperature of 400° C. for 20 minutes, and then under a reduced pressure at the same temperature as mentioned above for 5 minutes.

The resultant polycarbosilastyrene copolymer having a softening point of 190° C. to 200° C. and a number average molecular weight of 4500 could be smoothly melt-spun at a melt-spinning temperature of 230° to 240° C. and at a taking-up speed of 200 to 1000 m/min. That is, the copolymer exhibited on extremely excellent melt-spinning property.

A portion of the resultant polycarbosilastyrene copolymer filaments, which was obtained at a spinning temperature of 235° C. at a taking-up speed of 600 m/min, was heat-treated in the air atmosphere in such a manner that the filaments were heated in a temperature range of from 50° C. to 100° C. at a heating rate of 1° C./min and were left at 100° C. for 60 minutes.

The other portion of the filaments was heat-treated by the same procedures as those mentioned above except that the heat-treatment was carried out under a reduced pressure in the air atmosphere.

On the both portions of the filaments, substantially no shrinking and no fuse-bonding of the filaments to each other were found. Also, it was confirmed that both portions of the heat-treated filaments were completely insoluble and did not change the filament form thereof in tetrahydrofuran and in toluene.

The heat treated filaments were sintered in a nitrogen gas atmosphere in such a manner that the filament were sintered at a heating rate of 1° C./min in the temperature range of from 200° C. to 800° C., then at a heating rate of 40° C./min in the temperature range of from 800° C. to 1200° C., and finally, at a temperature of 1200° C. for one hour. In the sintered filaments, no fuse-bonding of the filaments to each other was found.

The sintered filaments completely consisted of silicon carbide in a $\beta$-crystalline structure determined by an X-ray analysis and had a thickness of 8 to 10 $\mu$m.

The position of the sintered filaments which had passed the heat treatment of the polycarbosilastyrene copolymer filaments in the air atmosphere had a tensile strength of 310 kg/mm$^2$ and an elastic modulus in tension of 18 T/min.

The other portion of the sintered filaments which had passed through the heat treatment under a reduced pressure, had a tensile strength of 320 kg/cm$^2$ and an elastic modulus in tension of 18 T/mm$^2$.

EXAMPLE 16

The same polycarbosilastyrene copolymer as that mentioned in Example 15 was melted, the melt was extruded through a film-forming slit at a temperature of 230° C., and then the resultant film-shaped stream of the melt was cooled and solidified on a peripheral surface of a cooling drum.

The film was heat treated at a temperature of 150° C. for 300 minutes, and then sintered in the same manner as that described in Example 15.

COMPARATIVE EXAMPLE 4

The same procedures as those described in Comparative Example 1 were carried out except that the polycarbosilane polymer filaments were heat-treated in the air atmosphere by heating the filaments at a heating rate of 1° C./min between 50° C. and 100° C. and then leaving the filaments at 100° C. for 60 minutes. The heat-treated filaments were sintered in the same manner as that described in Example 15.

It was found that the filaments had remarkably shrunk and fuse-bonded to each other and exhibited a low tensile strength of 105 kg/mm².

COMPARATIVE EXAMPLE 5

The same polysilastyrene polymer having a softening point of 86° C. to 94° C. as that described in Example 15 could be smoothly melt-spun at a melt-spinning temperature of 140° C. to 150° C. and at a taking-up speed of 200 m to 600 m/min.

The resultant polysilastyrene filaments were heat-treated in the same manner as that described in Example 15 in the air atmosphere.

It was found that during the heat-treatment, the filaments were remarkably shrunk and fuse-bonded to each other. The resultant product was not in the form of filaments.

We claim:

1. A process for producing a molded silicon carbide article, comprising the steps of:

molding a feed comprising a polycarbosilastyrene copolymer comprising recurring carbosilane units of the formula;

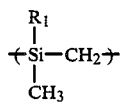

wherein $R_1$ represents a member selected from the group consisting of a hydrogen atom and a methyl radical, and recurring silastyrene units of the formula;

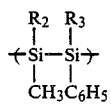

wherein $R_2$ and $R_3$, respectively, represent, independently from each other, a member selected from the group consisting of a hydrogen atom and methyl and phenyl radicals, and having a number averge molecular weight of at least 1,000, to a predetermined form;

applying a heat treatment to the molded polycarbosilastyrene copolymer article to provide a cross-linked, non-fusible polycarbosilastyrene copolymer article; and then sintering the cross-linked, non-fusible polycarbosilastyrene copolymer article at an elevated temperature to provide a molded, sintered silicon carbide article.

2. A process for producing a shaped silicon carbide article, comprising the steps of:

shaping a feed comprising a polyarbosilastyrene copolymer comprising recurring carbosilane units of the formula;

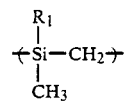

wherein $R_1$ represents a member selected from the group consisting of a hydrogen atom and a methyl radical, and recurring silastyrene units of the formula;

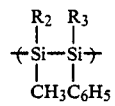

wherein $R_2$ and $R_3$, respectively, represent, independently from each other, a member selected from the group consisting of a hydrogen atom and methyl and phenyl radicals, and having a number average molecular weight of at least 1,000, to a predetermined form;

applying an ultra-violet ray treatment, a heat treatment or both the ultra-violet ray treatment and the heat treatment to the shaped polycarbosilastyrene copolymer article to provide a cross-linked, non-fusible polycarbosilastyrene colpolymer article; and then sintering the cross-linked, non-fusible polycarbosilastyrene copolymer article at an elevated temperature to provide a shaped, sintered silicon carbide article.

3. The process as claimed in claim 2 wherein the polycarbosilasytrene copolymer has the number average molecular weight in the range of from 1,000 to 50,000.

4. The process as claimed in claim 2 wherein the recurring carbosilane units and the recurring silastyrene units in the polycarbosilastyrene copolymer are in molar amounts, the sum of which is in the range of from 80 to 100 molar %.

5. The process as claimed in claim 2, wherein the polycarbosilastyrene copolymer has a ratio in molar amounts of the recurring carbosilane units to the recurring silasytrene units in the range of from 7:3 to 3:7.

6. The process as claimed in claim 2, wherein the shaped article is a filament and the shaping procedurre is effected by means of a melt-spinning method wherein the polycarbosilastyrene copolymer material is melted, the resultant melt is extruded through a spinneret, and the resultant filamenatry stream of the melt is solidified to provide polycarbosilastyrene copolymer material filament.

7. The process as claimed in claim 6, wherein the melt is extruded at a temperature of from 150° C. to 350° C.

8. The process as claimed in claim 6, wherein the ultra-violet ray treatment is carried out at a temperature between room temperature and 300° C.

9. The process as claimed in claim 6, wherein the ultra-violet ray treatment is carried out in an air atmosphere under a reduced pressure.

10. The process as claimed in claim 6, wherein the ultra-violet ray treatment is carried out in an inert gas atmosphere substantially free from oxygen gas.

11. The process as claimed in claim 6, wherein the sintering procedure is carried out at a temperature of 800° C. to 1400° C.

12. The process as claimed in claim 6, wherein the sintering procedure is carried out in an inert gas atmosphere.

13. The process as claimed in claim 6, wherein the polycarbosilastyrene copolymer feed is melt-spun in the shaping step.

14. The process as claimed in claim 13, wherein the resultant filaments are heat treated at a temperature of 50° C. to 250° C. in an air atmosphere.

15. The process as claimed in claim 13, wherein the resultant filaments are heat treated at a temperature of from 150° C. to 350° C. in an atmosphere substantially free from oxygen.

16. The process as claimed in claim 6, wherein the polycarbosilastyrene copolymer feed is molded to a predetermined form in the shaping step, and the resultant molded article is heat-treated.

* * * * *